(12) United States Patent
Grosse Kohorst et al.

(10) Patent No.: US 9,080,663 B2
(45) Date of Patent: Jul. 14, 2015

(54) SHIFT-BY-WIRE SHIFTING DEVICE HAVING MECHANICAL PARKING BRAKE ACTUATION

(75) Inventors: Berthold Grosse Kohorst, Vechta (DE); Andreas Giefer, Lemfoerde (DE); Ludger Rake, Steinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/321,924

(22) PCT Filed: Jul. 7, 2010

(86) PCT No.: PCT/DE2010/050043
§ 371 (c)(1),
(2), (4) Date: Nov. 22, 2011

(87) PCT Pub. No.: WO2011/012123
PCT Pub. Date: Feb. 3, 2011

(65) Prior Publication Data
US 2012/0067155 A1    Mar. 22, 2012

(30) Foreign Application Priority Data

Jul. 30, 2009  (DE) .................... 10 2009 028 127

(51) Int. Cl.
*F16H 59/02* (2006.01)
*F16H 63/48* (2006.01)
*F16H 59/10* (2006.01)

(52) U.S. Cl.
CPC ............ *F16H 59/0204* (2013.01); *F16H 63/48* (2013.01); *F16H 59/105* (2013.01); *Y10T 74/20049* (2015.01); *Y10T 74/20085* (2015.01)

(58) Field of Classification Search
CPC .... F16H 59/0204; F16H 59/105; F16H 63/48
USPC ..................................... 74/473.15
See application file for complete search history.

(56) References Cited

U.S. PATENT DOCUMENTS 4,712,640 A * 12/1987 Leigh-Monstevens et al. ............... 180/336
5,129,278 A * 7/1992 Nakao .................. 74/473.33
(Continued)

FOREIGN PATENT DOCUMENTS

DE 103 26 118 A1 1/2005
DE 10361209 B3 6/2005
(Continued)

OTHER PUBLICATIONS

International Search Report Oct. 10, 2010.
(Continued)

*Primary Examiner* — William Kelleher
*Assistant Examiner* — Zakaria Elahmadi
(74) *Attorney, Agent, or Firm* — Cohen & Hildebrand, PLLC

(57) ABSTRACT

An actuating device for selecting gear steps of a shift-by-wire gearshift transmission with a base housing, a selection lever, a mechanical transmission means for actuating the parking lock, and with a coupling element are arranged between the selection lever and the transmission means. The transmission means is selectively actuated by the coupling element only during selection and/or deselection of the parking lock position on the selection lever. The coupling element has an end which is linearly guided in a slot and an end which is pivotally guided in certain sections in the base housing. The coupling element and the selection lever are kinematically coupled with each other by way of a swivel support. The structure and the installation of the mechanical transmission linkage required for selectively actuating the transmission means to the parking lock can be simplified. The mechanical transmission linkage provides a smoothly operating haptic without significant play and can be used without complex changes also for actuating devices having more than one shift gate.

10 Claims, 3 Drawing Sheets

(56) References Cited

U.S. PATENT DOCUMENTS

| | | | |
|---|---|---|---|
| 5,144,853 A * | 9/1992 | Giudici | 74/473.15 |
| 5,706,702 A * | 1/1998 | Yamada | 74/473.15 |
| 5,921,141 A * | 7/1999 | Gouselis | 74/473.33 |
| 6,196,079 B1 * | 3/2001 | Paparoni | 74/473.15 |
| 6,382,046 B1 * | 5/2002 | Wang | 74/473.15 |
| 6,550,351 B1 * | 4/2003 | O'Reilly et al. | 74/335 |
| 6,662,924 B2 * | 12/2003 | Giefer et al. | 192/220.7 |
| 6,732,847 B1 * | 5/2004 | Wang | 192/220.4 |
| 7,322,457 B2 * | 1/2008 | Giefer et al. | 192/219.4 |
| 7,334,497 B2 * | 2/2008 | Giefer et al. | 74/473.12 |
| 7,765,049 B2 * | 7/2010 | Potter et al. | 701/70 |
| 8,327,732 B2 | 12/2012 | Giefer et al. | |
| 8,328,683 B2 * | 12/2012 | Tseng et al. | 477/8 |
| 2008/0098845 A1 * | 5/2008 | Meyer | 74/473.26 |
| 2009/0211388 A1 * | 8/2009 | Meysenburg et al. | 74/473.15 |

FOREIGN PATENT DOCUMENTS

| | | |
|---|---|---|
| DE | 10 2007 011 614 A1 | 9/2008 |
| DE | 102007015262 A1 | 10/2008 |
| DE | 102007058823 A1 | 6/2009 |
| EP | 0 757 192 A2 | 2/1997 |
| EP | 1 262 689 A1 | 12/2002 |
| WO | 03080411 A2 | 10/2003 |
| WO | 09 080411 | 7/2009 |

OTHER PUBLICATIONS

Copending U.S. Appl. No. 13/321,953, filed Nov. 22, 2011.
International Search Report of PCT Application No. PCT/DE2010/050044 corresponding to co-pending U.S. Appl. No. 13/321,953 dated Oct. 27, 2010.
Specification of co-pending U.S. Appl. No. 13/321,953 filed Nov. 22, 2011.

* cited by examiner

SHIFT-BY-WIRE SHIFTING DEVICE HAVING MECHANICAL PARKING BRAKE ACTUATION

This is an application filed under 35 USC §371 of PCT/DE2010/050043 on Jul. 7, 2010, claiming priority to DE 10 2009 028127.4 filed on Jul. 30, 2009.

BACKGROUND OF THE INVENTION

The invention relates to an actuating device for selecting gear steps of a shift-by-wire gearshift transmission, with a mechanical transmission means for parking lock actuation, according to the preamble of claim 1.

Parking locks are always employed when non-mechanical components are used for transmitting drive forces in an automobile, in particular in automatic transmissions having a hydrodynamic torque converter, i.e., if no continuous positive mechanical connection exists between the automobile engine and the wheels of the automobile even if a gear is engaged.

Automobiles with automatic transmission therefore have typically a parking lock to prevent the vehicle from accidentally rolling when the vehicle is at rest and the engine is shut off. The parking lock hereby blocks—as a result of a corresponding actuation by the driver—the driven transmission shaft which is always connected with the drive wheels so as to be secured against rotation, at least by bringing a pawl arranged in the automatic transmission into engagement with the toothing of a parking lock wheel arranged on the driven transmission shaft.

In principle, various mechanical, electrohydraulic and electromechanical systems are known as a transmission device between such parking lock constructed, for example, as a pawl and the actuating device for the vehicle transmission arranged in the passenger compartment of the automobile. Mechanical transmission devices for actuating the parking lock include, for example, a Bowden cable between the selection lever located in the passenger compartment and the transmission control arranged on the automatic transmission.

To improve the structural design with respect to the free arrangement of the actuating device in the passenger compartment, and to ensure an improved acoustic decoupling of the actuating device from the drive train of the automobile, modern automobiles or automatic transmissions increasingly employ a shift-by-wire principle, because modern automatic transmission are increasingly controlled entirely electronically.

Such "shift-by-wire" transmissions transmit the shift commands from the actuating device or from the selection lever of the automatic transmission generally exclusively electrically or electronically. In some situations, the parking lock may even be actuated automatically, for example with "Auto-P", where the parking lock is automatically engaged when the ignition key is pulled out or the occupants exit the automobile.

However, there is the additional requirement that the parking lock must also be operable mechanically when electronic systems fail or the electrical power supply of the automobile fails, so that the vehicle can be moved even under these circumstances. This may occur, for example, when the vehicle is in a repair shop or is towed in the event of a defect. Shift-by-wire actuating devices for automatic transition are known, where an additional mechanical connection, for example a Bowden cable, is installed between the selection lever and the transmission. The parking lock can then be operated mechanically by way of the Bowden cable even if the electrical systems fail completely, so that the vehicle can always be moved and again safely be parked.

To minimize the actuating travel of the Bowden cable between the actuating device and the transmission, to prevent unnecessary wear of the mechanical parking lock actuator and to minimize drag caused by the mechanical parking actuation when the selection lever is operated, actuating devices have been developed where the Bowden cable for the mechanical actuation of the parking lock can be selectively moved only when the selection lever is actually shifted into or out of the parking lock position. Conversely, the mechanical parking lock actuation is decoupled from the selection lever during all other movements of the selection lever between the individual gear stages or shift gates—by a corresponding design of the mechanical transmission linkage in the actuating device. The other selection lever movements can then be easily performed, without feedback of the friction forces from the mechanical parking lock actuation to the selection lever.

An actuating device of this generic type is disclosed, for example, in the patent DE 103 26 118 B4. This conventional actuating device includes a selection lever movable along a shift gate and a Bowden cable as a mechanical transmission means for actuating the parking lock. This conventional actuating device also includes a mechanical transmission linkage with a multiple joint linkage in form of coupled transmission elements, wherein the multiple joint linkage operates the Bowden cable to the parking lock—only when the selection lever is moved into the parking lock position or out of the parking lock position.

However, the design and installation of this conventional actuating device is relatively complex, in particular due to the multiple joint linkage in this actuating device which has a plurality of fork-shaped transmission elements that must be brought into engagement with a control plate arranged on the selection lever. Moreover, the conventional actuating device is initially limited to a movement of the selection lever along only a single shift gate, because the selection lever cannot be tilted to the side as a result of the multiple joint linkage formed at that location.

In order to be able to use this conventional actuating device also in conjunction with selection levers to be moved along several shift gates, for example in an automatic shift gate and in a manual touch gate, either the entire arrangement formed of selection lever, control plate and multiple joint linkage must be expanded by an additional universal joint and pivotally supported, or an additional swivel joint must be provided in the shaft of the selection lever. This conventional actuating device may also exhibit rattling noises when the components of the employed multiple link connection do not engage with each other and with the control plate completely without play.

Actuating devices also known in practice where the selective mechanical transmission linkage between the selection lever and the Bowden cable is implemented in form of a plurality of sequentially connected sliders or transmission elements with up to five interposed contact surfaces or transitions between components, in order to thereby solve the problem of sideways movement of the selection lever while simultaneously selectively transmitting the force to the Bowden cable. However, the corresponding component tolerances of the sequentially arranged transmission elements or the corresponding play between the adjoining transmission elements are additive, requiring the components in those actuating devices to be manufactured and installed with particularly exact tolerances.

In view of this background, it is an object of the present invention to provide an actuating device, with which the installation of the mechanical transmission linkage for selective actuation of the transmission means to the parking lock can be simplified, while simultaneously ensuring a smooth, reliable and low-noise actuation. Another important object of the present invention is to construct the mechanical transmission linkage so as to be suitable for actuating devices having more than one shift gate. Moreover, potential cost savings compared to known conventional solutions with more complex structures will be described.

BRIEF SUMMARY OF THE INVENTION

These objects are attained with an actuating device according to claim 1. Advantageous embodiments are recited in the dependent claims.

In an initially conventional manner, the actuating device according to the present invention is used for selecting gear steps and for generating the associated shift commands for a shift-by-wire-controlled transmission, for example for an automatic transmission of an automobile. The actuating device hereby includes, in a likewise conventional manner, a base housing with a selection lever that is movable along at least one shift gate between at least two gear stage positions and a parking lock position, as well as a mechanical transmission means to the gearshift transmission for the parking lock actuation. The actuating device also includes a coupling element between the selection lever and the transmission means. The transmission means is hereby operated by the coupling element only when the parking lock position is selected and/or deselected with the selection lever, whereas the transmission means is not operated by other movements of the selection lever.

According to the invention, the actuating device is characterized in that one end of the coupling element is linearly guided in a slot in the base housing of the actuating device, while the other end of the coupling element is pivotally guided in a slot—within a partial range of its travel as well as in the base housing. The connection between the end of the coupling element that is linearly guided in the slot and the selection lever is implemented as a direct connection by way of a swivel support.

In this way, the coupling element is initially advantageously guided very stably and without significant play by the slot in the base housing, thereby reducing or even preventing any noise generation through friction or chatter of the individual components of the mechanical transmission linkage against each other.

According to the invention, the aforementioned swivel support also couples the selection lever kinematically with the coupling element. Unlike in conventional systems, the coupling element is thus not in direct contact or engagement with selection lever or with the control plate arranged on the selection lever. This has the particular advantage that the actuating device according to the invention has a simpler design and can also be used with shift patterns having several shift gates arranged side-by-side in the direction of travel, for example an automatic shift gate and a manual touch gate. Because the two ends of the coupling element are guided in the slotted tracks arranged in the base housing—instead of in the conventional control plate arranged on the selection lever—the selection lever can also have a lateral degree of freedom (for example through support in a ball joint), so that the possibility for changing a shift gate can be implemented with a simple structure.

Unlike with other actuating devices known in practice, sequentially connected sliders or transmission elements between the selection lever and the coupling element are not required, since these are entirely replaced by the swivel support, whereby the sideways movability of the selection lever is simultaneously maintained due to the swivel support (for the purpose of switching between shift gates). On one hand, cost advantages in manufacture and installation are achieved due to the reduced number of parts and reduced complexity. On the other hand, the tolerance chain in the transmission of forces or movements from the selection lever via the swivel support and coupling element to the Bowden cable and consequently also the precision and the haptic in the actuation of the Bowden cable and the parking lock are improved.

The invention is initially implemented independent from the type of connection of the swivel support to, on one hand, the slot-guided coupling element and to, on the other hand, the selection lever, as long as the required forces for actuating the parking lock can be transmitted by the connection. For example, the swivel support may be connected with the coupling element and/or the selection lever by way of molecular or elastomer joints.

According to another preferred embodiment, the swivel support is connected with the slot-guided coupling element and with the selection lever by way of a ball joint. With the connection between the swivel support and the coupling element or between the swivel support and the selection lever implemented as a ball joint, the force is transmitted substantially without delay, ensuring the desired smoothness in the mechanical actuation of the parking lock. In addition, sideways movements can also be readily received, as may occur particularly in a sideways motion of the selection lever when shifting between different shift gates in the shift gate arrangement.

According to another preferred embodiment of the invention, both ends of the coupling element are connected on each side with respective guide axis stubs in associated slot tracks disposed in the base housing. The movement of the coupling element can be controlled particularly accurately and without play by guiding the coupling element on both sides in the associated housing-side slotted tracks.

The invention is initially implemented independent of the construction and arrangement of the slotted tracks, as long as both ends of the coupling element are securely guided. According to another preferred embodiment of the invention, the two sides of the slotted tracks are—for receiving the guide axis stubs of the coupling element guided on both sides in the slotted track—each formed as a single piece with the wall of the base housing of the actuating device. With this embodiment, the lateral walls of the housing of the base of the actuating device can advantageously simultaneously structurally guide the guide axis stubs of the coupling element in the slotted track. This advantageously reduces the number of parts and the installation complexity, with a potential reduction in additional costs.

According to another particularly preferred embodiment of the invention, the connection of the slot-guided coupling element to the transmission means (for example to the Bowden cable to the parking lock) and/or to the swivel support is each arranged coaxially with the associated guide axis stubs of the coupling element.

In this way, the coupling element and its force-transmitting connection with the adjoining components can have a particularly simple structure, in that the guide axis stubs of the coupling element which protrude from both sides of the coupling element and are configured for engagement in the slotted guide operate simultaneously as a seat in particular for connecting bolts, wherein the connecting bolts in turn form a connection of the coupling element to the transmission means and/or to the swivel support. Alternatively, connecting bolts of the coupling element providing a connection with the transmission means and/or the swivel joint may simultaneously form the guide axis stubs that laterally protrude from the coupling element, which are then used to guide the coupling element through engagement in the slotted guide.

According to additional embodiments of the invention, the transmission means is a linkage or a double-acting Bowden cable. In particular, with a double-acting Bowden cable, the actuating device can be flexibly placed in the region of the cockpit or the center console of the automobile, wherein the double-acting Bowden cable enables at the same time the transmission of both pulling and pushing forces for actuating the parking lock.

BRIEF DESCRIPTION OF THE DRAWINGS

The invention will now be described in more detail with reference to the drawings which illustrate only exemplary embodiments.

DETAILED DESCRIPTION OF THE INVENTION

Figure 1:
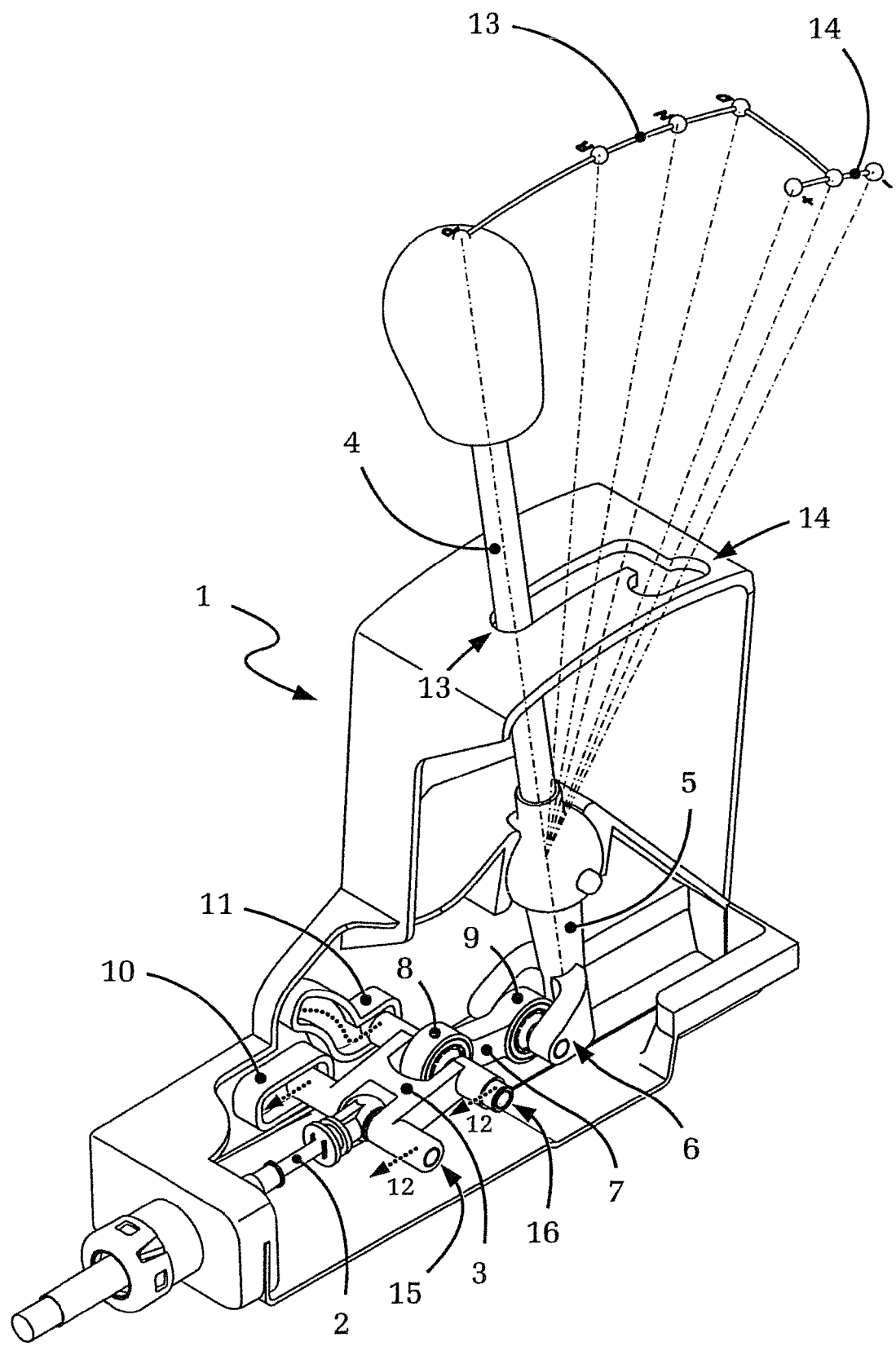
FIG. 1 shows in an isometric view an embodiment of an actuating device according to the invention with mechanical parking lock actuation, with the parking lock engaged.

FIG. 1 shows in an isometric view an embodiment of an actuating device according to the invention for a shift-by-wire-shifted transmission, wherein the actuating device of a general type includes an additional mechanical parking lock actuation. With the illustrated actuating device, the parking lock is mechanically actuated with a Bowden cable 2 which is connected to the lower end 5 of the selection lever 4 by way of a mechanical transmission linkage consisting of a swivel support 7 and a coupling element 3.

With respect to the mechanical transmission linkage, reference is first made to the coupling element 3 which has an end 15 that is linearly guided in a slot in a base housing 1 as well as an end 16 which is likewise linearly and in certain sections pivotally guided in a slot in the base housing 1, wherein the coupling element 3 and the selection lever 4 are coupled with each other kinematically by way of a swivel support 7.

In the illustrated embodiment, the coupling element 3 has protruding guide axis stubs 15, 16 arranged on both its end that is linearly guided in the slot as well as on its end that is linearly guided in the slot only in certain sections. The guide axis stubs 15, 16 thereby engage in a linear slot pair 10 (Bowden cable end) or in a slot pair 10 and 11 which is formed in part linearly and in part as a segment of a circle (selection lever-side end of the coupling element 3). Only one slot 10 or 11 of the two slot pairs 10 and 11 is visible in the figures, because the housing 1 of the actuating device is partially cut away in the figures.

The coupling element 3 is hereby guided by the slotted guides 10, 11 such that the Bowden cable-side end 15 of the coupling element moves linearly (and thus mechanically operates the Bowden cable 2 and the parking lock) only when the selection lever 4 is actually moved into the parking lock position or out of the parking lock position. With the other movements of the selection lever 4 in the automatic shift gate 13, in the touch gate 14 and between the automatic shift gate 13 and the touch gate 14, there is no movement of the Bowden cable-side end 15 of the coupling element 3. Instead, the coupling element is pivoted during these movements of the selection lever 4 about the Bowden cable-side guide axis stubs 15 as a result of a pivoting motion of the selection lever-side guide axis stubs 16 caused by sliding along the region of the slot 11 shaped as the segment of a circle. The cooperation of the coupling element 3 with the slots 10, 11 is again shown clearly and in detail in FIGS. 2 and 3, whereby reference is made to the following description.

FIG. 1 shows furthermore the connection between the coupling element 3 and the lower end of the selection lever 4. Unlike in the state-of-the-art, this connection is not implemented in the actuating device according to FIG. 2 by additional sequentially arranged and possibly overmounted transmission and/or coupling elements or by a selection lever with control plate and downstream mechanical transmission linkage, but directly by a swivel support 7, which is connected with both the coupling element 3 and—via the coupling fork 6—also with the lower end 5 of the selection lever 4 via ball joints 8, 9.

The additional transmission elements between the selection lever 4 and the coupling element 3 required in the state-of-the-art can thus be eliminated or replaced by the swivel support 7 as the only remaining transmission element, wherein the swivel support 7 also readily allows the sideways motion of the selection lever 4, for example, when changing a shift gate. Instead of up to four transmission elements with up to five corresponding contact surfaces between the selection lever 4 and the Bowden cable 2, the actuating device according to FIG. 1 has now only two transmission elements 3 and 7 and accordingly only three corresponding contact surfaces between the selection lever 4 and the Bowden cable 2. The requirements on the transmission components with respect to the tolerance chain are also commensurately relaxed, and the number of the required components and the resulting play during actuation of the parking lock are also reduced.

Figure 2:
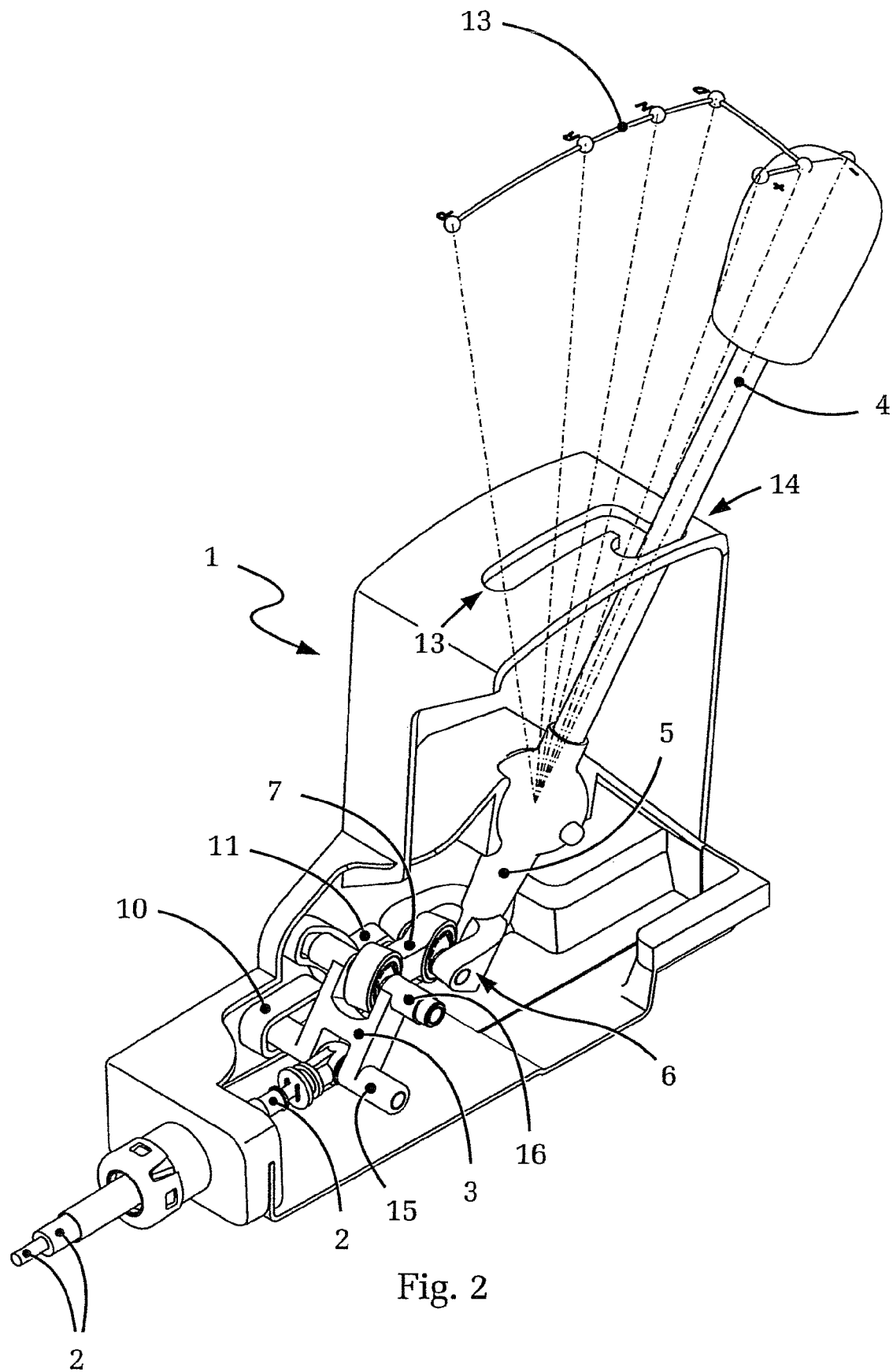
FIG. 2 shows in a diagram and in a view corresponding to FIG. 1 the actuating device according to FIG. 1 with a disengaged parking lock.

The combination of FIGS. 1 and 2 also clearly shows the operation of the mechanical actuation of the parking lock with the Bowden cable 2, which occurs selectively only when the selection lever 4 is actually moved into the parking lock position P or out of the parking lock position P.

As seen from the travel paths of the guide axis stubs 15, 16 of the coupling element 3 illustrated by dotted lines in FIG. 1, which are guided in the slots 10 and 11 (which are present on both sides, but shown in FIG. 1 only on one side), the selection lever 4 is initially moved out of the parking lock position P—through force transmission by way of the swivel support 7—by only a linear displacement of the coupling element 3 along the dotted arrows 12, whereby the Bowden cable 2 and thus the (unillustrated) parking lock actuation arranged on the Bowden cable 2 on the transmission side are also actuated.

During further movement of the selection lever 4 between the different drive stages R, N, D or between the shift gates 16 and the touch gate 14 as well as in the touch gate 14 itself (see the situation illustrated in FIG. 2), the guide axis stubs 15 of the coupling element 3 on the side of the Bowden cable strike the end of the slotted guide 10 on the side of the Bowden cable, whereas the guide axis stubs 16 on the side of the selection lever are forced to perform a pivoting motion about the guide axis stop 15 on the side of the Bowden cable as pivot axis because of blocking of the guide axis stubs 15 on the side of the Bowden cable and because of the shape of the additional slotted guide 11 implemented as segment of a circle (see FIG. 1). During all movements of the selection lever 4 between the drive stages R, N, D of the shift gate 13 and between the actuating positions "+" and "−" within the touch gate 14, the coupling element 3 only performs a pivoting motion about its guide axis stub 15 on the side of the Bowden cable, similar to a knee lever formed by the swivel support 7 and the coupling element 3, so that the Bowden cable 2 is not actuated or moved further.

The Bowden cable 2 and the parking lock actuation connected with the Bowden cable 2 on the transmission side are therefore operated gently and are only actuated or moved when the parking lock is actually to be engaged or disengaged. The actuating forces on the selection lever 7 are then also reduced, because the sometimes significant friction forces in the Bowden cable 2 as well as in the connected parking lock actuation need no longer be overcome during the normal gear selection or change between the different drive stages of the gear-shift transmission.

Figure 3:
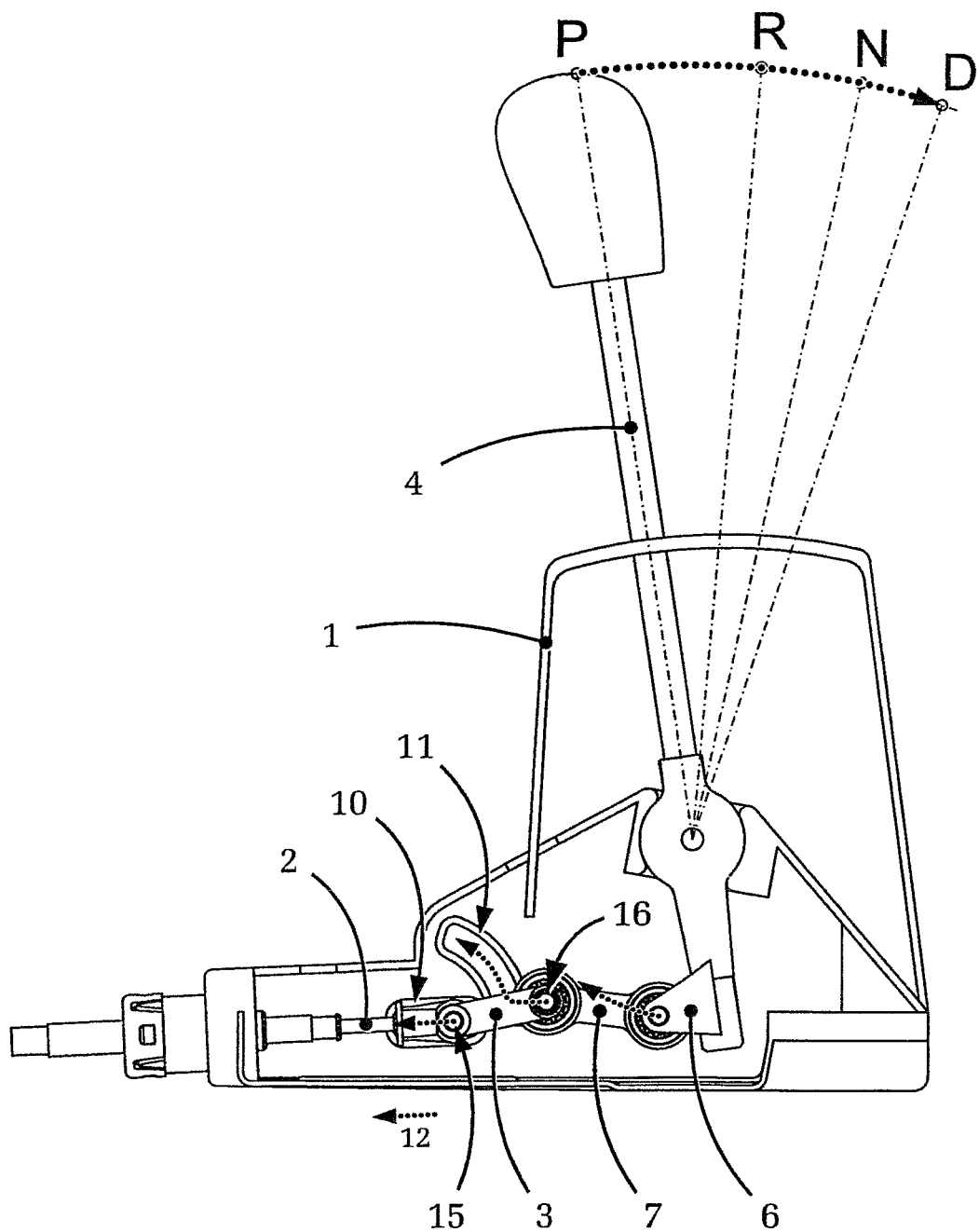
FIG. 3 shows in a side view the actuating device according to FIG. 1 with the parking lock engaged according to FIG. 2.

FIG. 3 shows once more, here in a side view, the actuating device according to the embodiment in FIG. 1 and FIG. 2. Clearly shown are again the selection lever 4, the Bowden cable 2 as well as the force transmission chain formed of the swivel support 7 and the slot-guided coupling element 3 between the lower end of the selection lever 4 and the attachment location on the Bowden cable 2. The operation of the selective force transmission or actuation of the Bowden cable 2 during movement of the selection lever 4 between, on one hand, the selection lever positions "P" and "R" and, on the other hand, between the selection lever positions "R", "N" and "D" is also clearly shown again in FIG. 3.

The slot-guided coupling element 3 then moves linearly in the direction of the arrow 12 (in the drawing to the left) due to the parallel guiding in the two slotted guides 10, 11 in this region (see FIG. 1) and due to the force transmission from the selection lever 7 by the coupling element 8, thus relaxing the Bowden cable 2 and disengaging the (unillustrated) parking lock connected to the Bowden cable 2 on the transmission side. Upon further actuation of the selection lever between the selection lever positions "R", "N" and "D" and in the touch gate 14 between the actuating positions "+" and "−" (see FIG. 2), the coupling element 3 only executes the aforementioned pivoting motion about its guide axis stub 15 on the side of the Bowden cable, thus preventing any further actuation of the Bowden cable 2 in this situation.

As particularly clearly illustrated in FIG. 3, the slotted guides 10, 11 are arranged above one another with a slight vertical offset, so that the force transmission chain formed of the swivel support 7 and the coupling element 3—similar to a knee lever—is unable to assume a completely stretched configuration, which may otherwise cause self-locking at the beginning of the crescent-shaped pivoting motion.

In summary, an actuating device is provided, in particular for shift-by-wire-actuated automatic transmissions, wherein the structure and installation of the mechanical transmission linkage required for selective mechanical actuation of the parking lock can be significantly simplified. In particular, the mechanical transmission linkage according to the invention is also suitable for actuating devices with more than a single shift gate, without requiring complex alterations and retrofits.

The actuating device according to the invention also exhibits a smooth haptic and insignificant play and is low-noise and is reliable in its operation. The number of components can be reduced, the tolerance chains can be improved and associated cost savings compared to conventional actuating devices of this type can be achieved.

List of references symbols

| | |
|---|---|
| 1 | Housing, base housing |
| 2 | Transmission means, Bowden cable |
| 3 | Slot-guided coupling element |

-continued

List of references symbols

| | |
|---|---|
| 4 | Selection lever |
| 5 | Lower selection lever end |
| 6 | Coupling fork |
| 7 | Swivel support |
| 8, 9 | Ball joint |
| 10, 11 | Slotted guide |
| 12 | Movement direction |
| 13 | Shift gate |
| 14 | Touch gate |
| 15, 16 | Guide axis stub |

The invention claimed is:

1. An actuating device for selecting gear steps of a shift-by-wire gearshift transmission, the actuating device comprising:
   a base housing (1),
   a selection lever (4) movable along at least one shift gate (13, 14) between at least two gear stages and a parking lock position (P), a mechanical transmission device (2) to the gearshift transmission for actuating a parking lock, as well as a coupling element (3) arranged between the selection lever (4) and the transmission device (2), wherein actuation of the transmission device (2) by the coupling element (3) only occurs selectively during selection and deselection of the parking lock position with the selection lever (4), and
   wherein the coupling element (3) has a first end (15) closest to the transmission device (2) which is linearly guided in a first slot of the base housing (1) and an opposite second end (16) which is guided in a second slot in the base housing (1), wherein the coupling element (3) and the selection lever (4) are coupled with each other by way of a swivel support (7),
   wherein the second slot in the base housing (1) includes a pivotally guided slot section followed by a linear guided slot section; each of the pivotally guided slot section and the linear guided slot section have a shared common end and an opposite terminating end; the second slot in the base housing (1) being disposed so that the terminating end of the pivotally guided slot section is disposed closest to the transmission device (2).

2. The actuating device according to claim 1, wherein the swivel support (7) is connected with the coupling element (3) as well as with the selection lever (4) via a respective ball joint (8, 9).

3. The actuating device according to claim 1, wherein the ends of the coupling element (3) are each supported on both sides by guide axis stubs (15, 16) in associated slots (10, 11) in the base housing (1).

4. The actuating device according to claim 1, wherein the two ends of the slotted guide (10, 11) for the coupling element (3) are each formed as one piece with a wall of the base housing (1).

5. The actuating device according to claim 1, wherein the connection of the coupling element (3) to the transmission device (2) and/or to the swivel support (7) is each arranged coaxially relative to the associated guide axes (15, 16) of the coupling element (3).

6. The actuating device according to claim 1, wherein the transmission device (2) is a linkage.

7. The actuating device according to claim 1, wherein the transmission device (2) is a double-acting Bowden cable (2).

8. The actuating device according to claim 1, wherein the coupling element (3) has a first end and an opposite second end, while the swivel support (7) has a first end and an opposite second end; the first end of the coupling element (3) is coupled to the first end of the swivel support (7); and while the parking lock position (P) is deselected, the second end of the coupling element (3) and the second end of the swivel support (7) are drawn closer together than when the parking lock position (P) is selected.

9. The actuating device according to claim 1, wherein an end of the selection lever (4) coupled to the swivel support (7) is not attached to the base housing (1).

10. The actuating device according to claim 1, wherein the first and second slots are arranged relative to one another so that the swivel support (7) and the coupling element (3) are unable to assume a completely stretched configuration.

* * * * *